United States Patent

Nishida et al.

[11] Patent Number: 6,058,997
[45] Date of Patent: May 9, 2000

[54] PNEUMATIC RADIAL TIRE HAVING AT LEAST TWO ZIGZAG BELT LAYERS

[75] Inventors: Kenichiro Nishida; Kazuyuki Kabe; Shuji Takahashi; Tsuneo Morikawa; Hitoshi Horie, all of Hiratsuka, Japan

[73] Assignee: The Yokohama Rubber Co., Ltd., Tokyo, Japan

[21] Appl. No.: 09/011,758

[22] PCT Filed: Jul. 25, 1997

[86] PCT No.: PCT/JP97/02587

§ 371 Date: Feb. 25, 1998

§ 102(e) Date: Feb. 25, 1998

[87] PCT Pub. No.: WO98/04424

PCT Pub. Date: Feb. 5, 1998

[30] Foreign Application Priority Data

Jul. 25, 1996 [JP] Japan .................................. 8-196391
Aug. 1, 1996 [JP] Japan .................................. 8-203926
Aug. 1, 1996 [JP] Japan .................................. 8-203929

[51] Int. Cl.[7] .............................. B60C 9/18; B60C 9/20; B60C 9/26

[52] U.S. Cl. .......................... 152/529; 152/528; 152/533; 152/534; 152/536

[58] Field of Search .................................. 152/528, 529, 152/533, 534, 536

[56] References Cited

U.S. PATENT DOCUMENTS

| 2,895,525 | 7/1959 | Lugli | 152/528 X |
| 2,982,327 | 5/1961 | Vanzo et al. | 152/528 |
| 3,563,296 | 2/1971 | Wells | 152/533 |
| 5,535,801 | 7/1996 | Iseki et al. | 152/533 X |

*Primary Examiner*—Adrienne C. Johnstone
*Attorney, Agent, or Firm*—Arent Fox Kintner Plotkin & Kahn PLLC

[57] ABSTRACT

A pneumatic radial tire has at least two belt layers disposed at a tread portion thereof, wherein the two belt layers are constituted by inclining a strip formed by aligning a plurality of reinforcing cords to a tire circumferential direction and extending it zigzag in the tire circumferential direction so that the strip is turned back from the lower belt layer to the upper belt layer at both end portions of the two belt layers, and zone portions in which the reinforcing cords incline to the right in the tire circumferential direction and the zone portions in which the reinforcing cords incline to the left in the tire circumferential direction are alternately arranged.

8 Claims, 7 Drawing Sheets

6,058,997

PNEUMATIC RADIAL TIRE HAVING AT LEAST TWO ZIGZAG BELT LAYERS

TECHNICAL FIELD

This invention relates to a pneumatic radial tire and more particularly, to a pneumatic radial tire which improves straight driving stability while improving edge separation resistance of belt layers.

BACKGROUND ART

Generally, belt layers of pneumatic radial tires for passenger cars have the construction in which two belt layers having steel cords aligned obliquely in a tire circumferential direction and having cut ends of the steel cords at both end portions thereof are laminated in such a fashion that the steel cords cross one another between the layers. The belt layers having such a construction involve the problem that because a stress is likely to concentrate on the cut end portions of the steel cords due to a load during driving, so-called "edge separation" or in other words, peel of the steel cord ends from the rubber layer, is likely to occur. The same problem develops also in heavy load pneumatic radial tires for small trucks and for trucks and buses having three or more belt layers.

The belt layers of the conventional pneumatic radial tires have the two-layered structure wherein a belt layer having steel cords inclined to the right in a tire circumferential direction and a belt layer having steel cords inclined to the left are laminated. For this reason, the belt layers having such a two-layered structure inevitably generates a spiral torsion due to the tensile strength in the tire circumferential direction that occurs when the tire rolls. Since this torsion of the belt layers generates a lateral force to the tire, the tire undergoes drift or runs toward one side at the time of straight driving and straight driving stability is impeded.

DISCLOSURE OF INVENTION

It is a main object of the present invention to provide a pneumatic radial tire which makes it possible to improve straight driving stability while improving an edge separation resistance of belt layers.

The object of the present invention described above can be accomplished by a pneumatic radial tire having at least two belt layers at a tread portion thereof, characterized in that the two belt layers are constituted by inclining a strip each being formed by aligning a plurality of reinforcing cords relative to a tire circumferential direction and extending them zigzag in the tire circumferential direction in such a fashion that the reinforcing cords are turned back from the inner belt layer to the outer belt layer at both end portions of the belt layers and zone portions in which the reinforcing cords incline to the right in the tire circumferential direction and zone portions in which the reinforcing cords incline to the left are alternately disposed.

Since the belt layers are formed by arranging the reinforcing cords obliquely to the tire circumferential direction and turning back them zigzag, the cut ends of the reinforcing cords are not formed at both end portions of the belt layers. Therefore, the edge separation which occurs due to the stress concentration on the portions of the reinforcing cords near their cut ends can be avoided.

Moreover, those outer and inner two belt layers do not extend around the full circumference in the tire circumferential direction under the state where their reinforcing cords incline in the same direction, but the portions in which the reinforcing cords incline to the right and the portions in which they incline to the left are arranged alternately at predetermined pitches in the tire circumferential direction. In consequence, the two belt layers can offset the spiral torsion that results from the tensile strength in the tire circumferential direction, and the ply steer due to the torsion of the belt layers when the tire rolls, that is, the side run of the tire, can be inhibited and its straight driving stability can be improved.

BEST MODE FOR CARRYING OUT THE INVENTION

Figure 1:
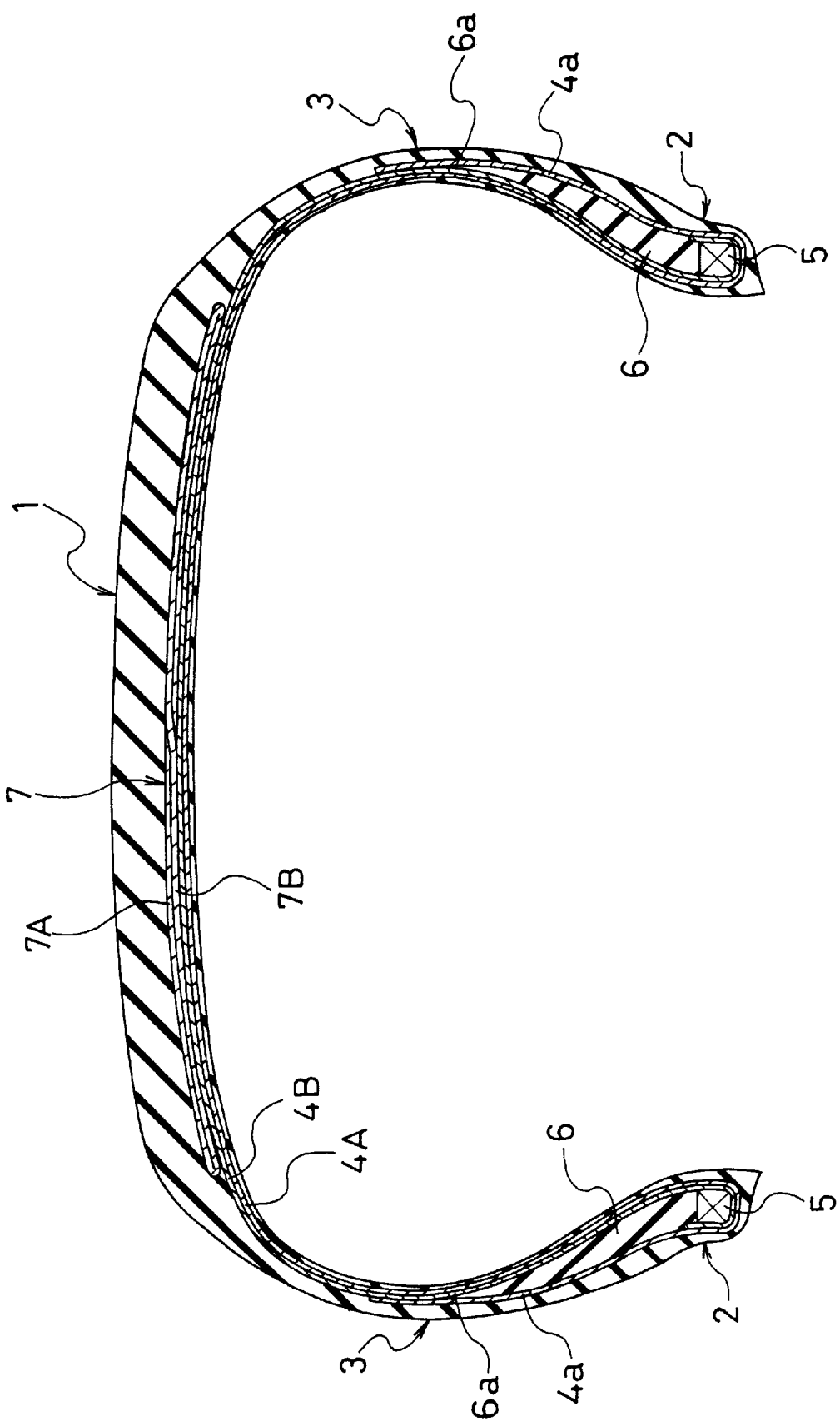
FIG. 1 is a tire meridian sectional view showing an example of a pneumatic radial tire used for a passenger car according to the present invention.

In FIG. 1, reference numeral 1 denotes a tread portion, reference numeral 2 denotes a bead portion and reference numeral 3 denotes a sidewall portion. Two layers of carcass layers 4A and 4B, each being produced by arranging reinforcing cords substantially in a tire width-wise direction, are disposed inside a tire, and both end portions 4a and 4b of both carcass layers are turned up from inside to outside of the tire round right and left bead cores 5, respectively. Both end portions 4a of the inner carcass layer 4A extend outward in a tire radial direction beyond outer peripheral edges 6a of bead fillers 6 in such a fashion as to wrap these bead fillers 6, respectively. Two layers of belt layers 7, each being produced by arranging a strip X of a plurality of aligned reinforcing cords obliquely relative to the tire circumferential direction, are disposed on the outer peripheral portion of the carcass layer of the tread portion 1.

Figure 2:
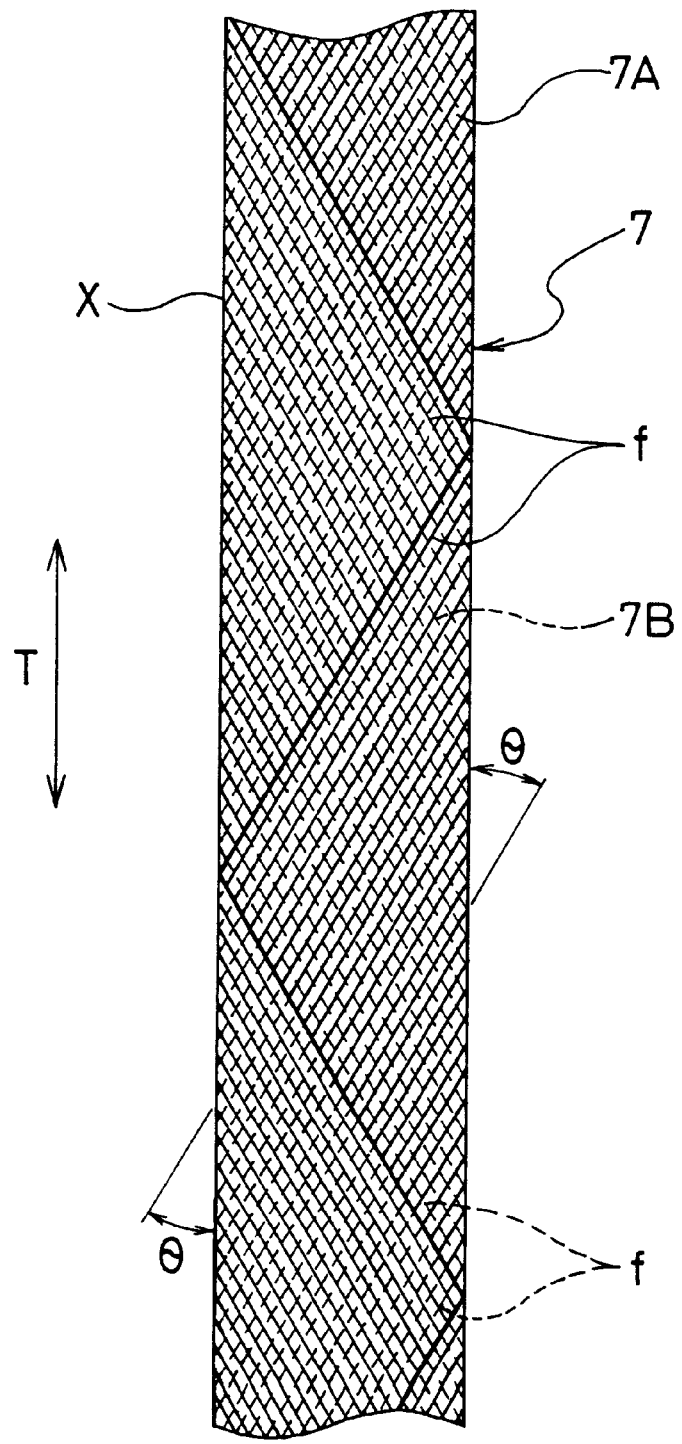
FIG. 2 is a plan view of principal portions of the belt layers shown in FIG. 1.

Both of the inner belt layer 7B and the outer belt layer 7A laminated on the outer peripheral side of the inner belt layer 7B comprise organic fiber cords. As shown in FIG. 2, the strip X comprising such reinforcing cords f inclines relative to the tire circumferential direction T, is turned back at both end portions of the belt layers 7A and 7B from the inner belt layer 7B to the outer belt layer 7A and extends zigzag in the tire circumferential direction T.

In the belt layers 7A and 7B described above, the reinforcing cords f cross one another between the layers, each belt layer 7A, 7B comprises zone portions in which the reinforcing cords f incline to the right in the tire circumferential direction T and zone portions in which the reinforcing cords incline to the left in the tire circumferential direction T, and these zone portions are arranged alternately and repeatedly at predetermined pitches.

Figure 3:
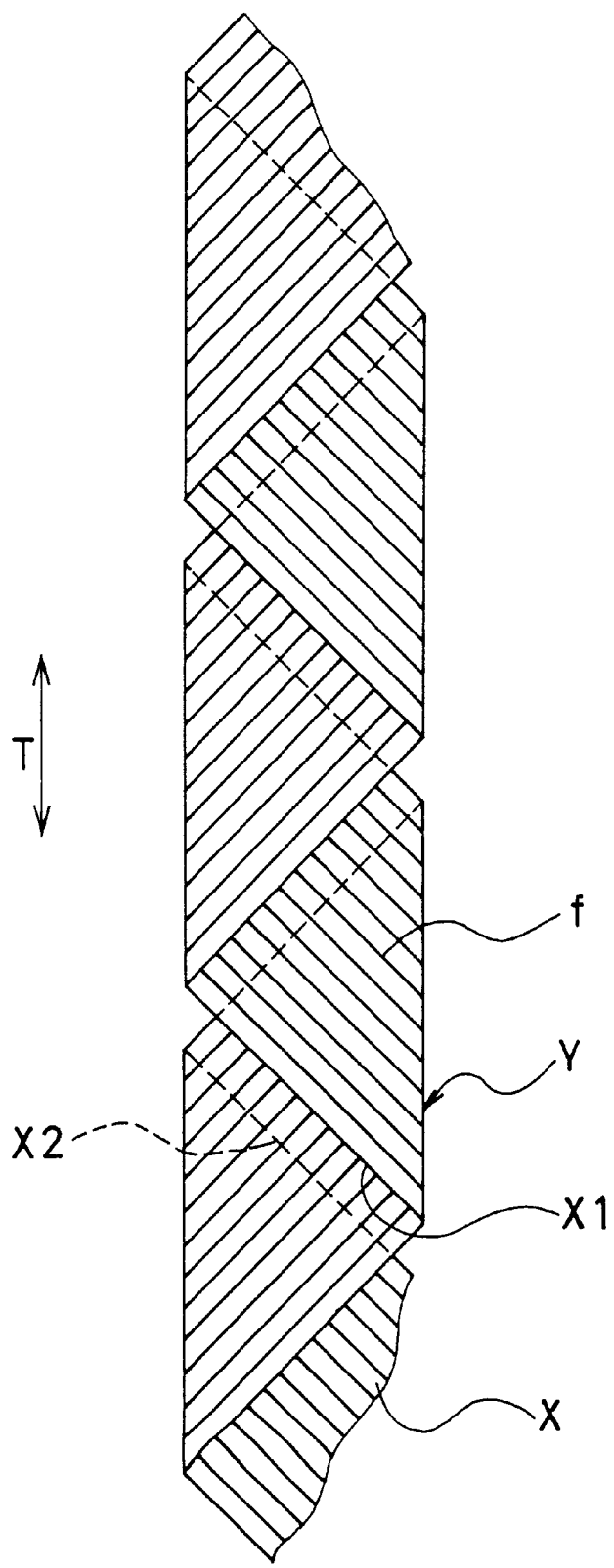
FIG. 3 is an explanatory view showing a method of producing the belt layers shown in FIG. 2.

In the construction of such belt layers 7A and 7B, the strip X produced by aligning a plurality of reinforcing cords and bundling them by an elastomer has a greater width than the belt width. This strip X is turned back zigzag in the width of the belt layer while inclining to the tire circumferential direction T as shown in FIG. 3. The belt body Y produced in this manner is wound around the full circumference of the tire on the outer circumferential side of the carcass layer and is shaped into a green tire. The tire according to the present invention can be obtained by vulcanization-molding this green tire. Incidentally, FIG. 3 shows the strip X deviated in such a fashion as to define a gap at the turn-back end portion of the strip X in order to have the turn-back method more easily understood. In practice, however, the strip X is turned back so that one of the side edges X1 of the strip X so turned back overlaps with the other side edge X2 without defining any gap as shown in FIG. 2.

As described above, in the present invention, the strip X of the reinforcing cords f is turned back zigzag and obliquely to the tire circumferential direction T at both end portions of the belt layers 7A and 7B. Therefore, the cut ends of the reinforcing cords do not exist at both ends of the belt layers 7A and 7B and for this reason, the edge separation resistance of the belt layer can be improved.

Further, the belt layers 7A and 7B have the relation such that their reinforcing cords f cross one another between the layers and moreover, they are disposed so that the zone portions in which the reinforcing cords f incline to the right in the tire circumferential direction T and the zone portions in which the reinforcing cords incline to the left are arranged alternately and repeatedly to the tire circumferential direction T. In consequence, the spiral torsion that develops in the belt layers 7A and 7B when the tensile strength acts in the tire circumferential direction T is offset by the zone portions arranged alternately in the tire circumferential direction and having the different cord inclining directions, and ply steer does not occur. Therefore, non-uniform roll of the tire when the tire rolls can be restricted and straight driving stability can be improved.

Because the reinforcing cords f of the belt layers 7A and 7B are constituted from the organic fiber cords, the weight of the tire can be reduced.

Figure 4:
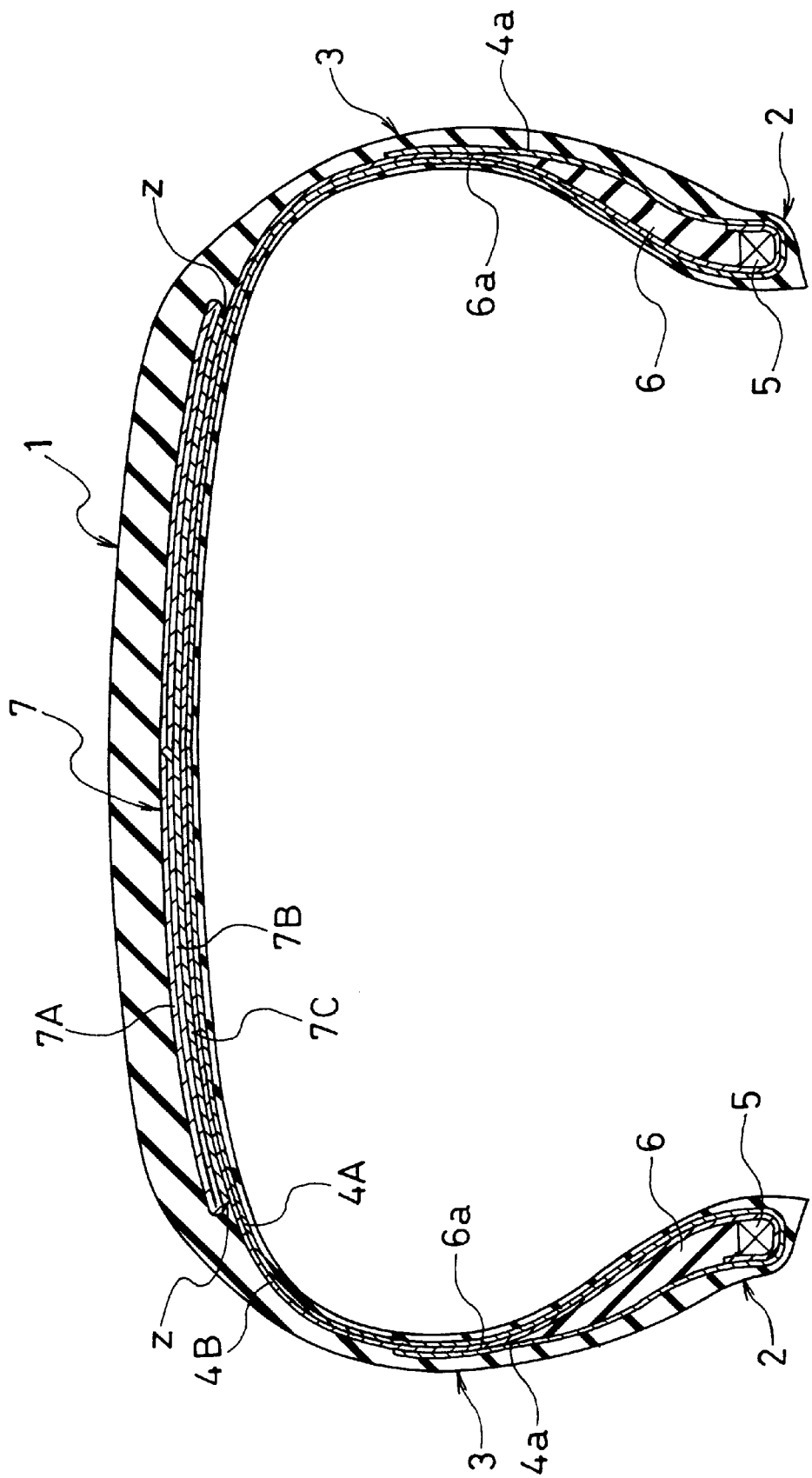
FIG. 4 is a tire meridian sectional view showing another example of a pneumatic radial tire used for a passenger car according to the present invention.

FIG. 4 shows another example of the pneumatic radial tire used for a passenger car according to the present invention. This embodiment employs a three-layered structure in which a belt layer 7C made of steel cords is further disposed in addition to the belt layers 7A and 7B of the embodiment described above.

The belt layer 7C is disposed as the innermost layer on the outer peripheral side of the carcass layer 4 and the belt layers 7A and 7B are disposed outside this belt layer 7C. The belt layer 7C has a structure in which reinforcing cords e made of a large number of steel cords are arranged at angles of inclination of 15 to 65 degrees to the tire circumferential direction. Moreover, the outer belt layers 7A and 7B have a width greater than that of the inner belt layer 7C and are laminated on the belt layer 7C in such a fashion as to cover both ends z of the belt layer 7C.

Since rigidity of the belt portion can be improved by disposing such a belt layer 7C produced by arranging the reinforcing cords e of the steel cords, the cornering force and eventually, maneuverability, can be improved Even when the belt layer 7C is produced by arranging the steel cords in such a fashion that the cut ends are exposed at both ends of the belt layer, the stress concentration on the portions near the cut end portions of the reinforcing cords e can be restricted because such a belt layer 7C is disposed on the inner peripheral side of the belt layers 7A and 7B and both ends z of the belt layer 7C are covered with the belt layers 7A and 7B. Consequently, edge separation resistance of the belt layer 7C having the improved rigidity is not deteriorated.

The angle of inclination a of the reinforcing cords e of the belt layer 7C to the tire circumferential direction T is set to 15 to 65 degrees but in order to improve the hoop effect of the belt layers and to thereby improve high-speed maneuverability and high-speed durability, the angle of inclination a preferably satisfies the relation $15° \leq a < 45°$ and more preferably, 15 to 40 degrees.

When the increase of the rolling resistance due to the improvement in the belt rigidity is not desired, however, or in other words, when the emphasis is put on the rolling resistance, the angle of inclination a is preferably set to a large range of $45° \leq \alpha \leq 65°$. Particularly when the angle $\alpha$ is within the range of $54.7° \pm 5°$, this angle is near to a so-called "specific angle". Therefore, fluctuation of the cord angles during tire rolling can be reduced and the rolling resistance can be lowered.

The number of reinforcing cords e of the belt layer 7C may be smaller than the number of the steel reinforcing cords of the belt layer that has been employed conventionally.

The angle of inclination $\theta$ of the reinforcing cords f of the belt layers 7A and 7B to the tire circumferential direction T is preferably within the range of 15 to 45 degrees. When the angle of inclination e is less than 15 degrees or exceeds 45 degrees, high speed durability drops.

Known organic fiber cords can be used as the organic fiber cords used for the reinforcing cords of the belt layers 7A and 7B and examples are those which have a relatively high elastic modulus such as an aromatic polyamide fiber, a rayon fiber, a polyparaphenylene benz-bis-oxazole fiber, etc. Besides these organic fibers, it is possible to use twisted yarns obtained by twisting at least one of the fibers selected from the group comprising a polyethylene fiber, a polyarylate fiber, a polyvinyl alcohol fiber, a polyethylene terephthalate fiber, a polyethylene 2,6-naphthalate fiber, a nylon fiber, and so forth. Preferred particularly is an aromatic polyamide fiber cord which has a strength and an elastic modulus substantially equal to those of the steel cord.

When the weight reduction is not taken into consideration, the reinforcing cords f of the belt layers 7A and 7B may be constituted by the steel cords in place of the organic fiber cords.

Conventional reinforcing cords can be used as the reinforcing cords of the carcass layers 4A and 4B, and preferred examples are a nylon fiber cord and a polyester fiber cord.

Though two layers of the carcass cords are preferably disposed as in the embodiment described above, this arrangement is not particularly limitative, and at least one carcass layer may be disposed.

The pneumatic radial tire for the passenger car according to the present invention has preferably two or three belt layers as in the embodiment described above but the number of the layers is not limitative and at least two belt layers may be disposed.

Figure 7:
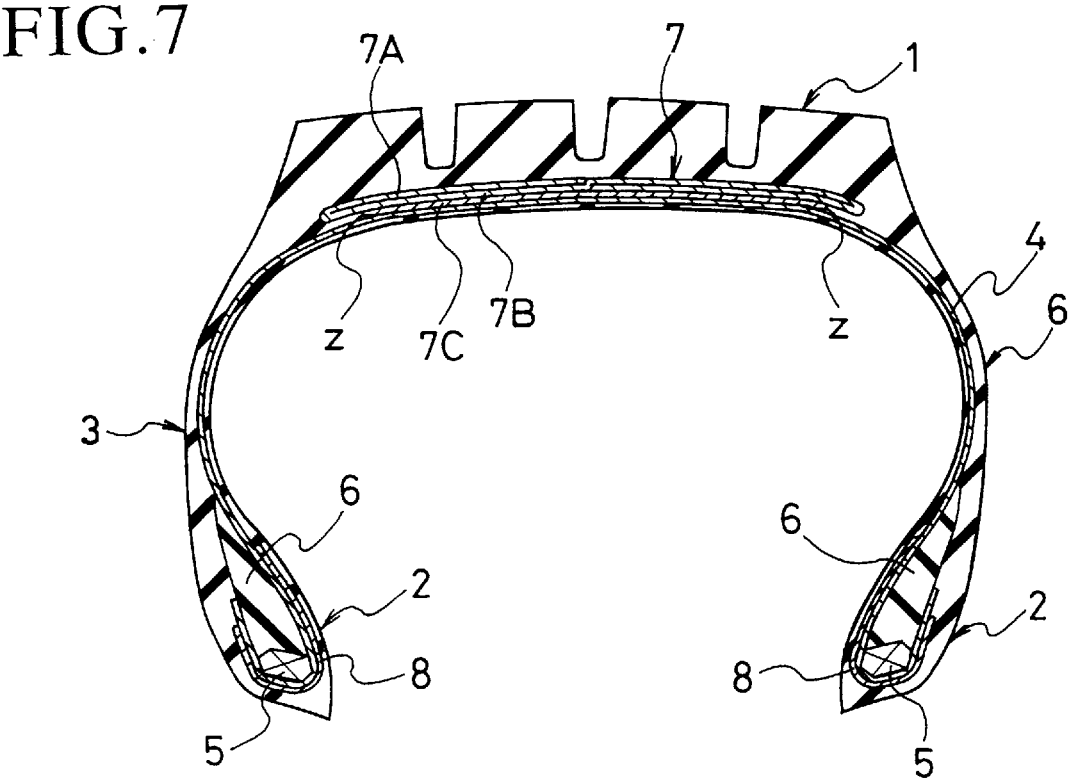
FIG. 7 is a tire meridian sectional view showing an example of a pneumatic radial tire used for a heavy load car according to the present invention.

FIG. 7 shows an example of a pneumatic radial tire for use in a heavy load car such as a truck or a bus according to the present invention. The tire has three belt layers, and the same constituent elements as those in the foregoing embodiments are represented by the same reference numerals.

In this embodiment, a single carcass layer 4 is interposed between the bead portions 2 and both of its end portions are turned back from the inside to the outside of the tire round the bead cores 5 in such a manner as to clamp the bead fillers 6 between them, respectively. A single layer of reinforcing layer 8, which is arranged so that the steel cords incline to the tire circumferential direction, is disposed adjacent to the carcass layer 4 in the bead portions 2.

Figure 5:
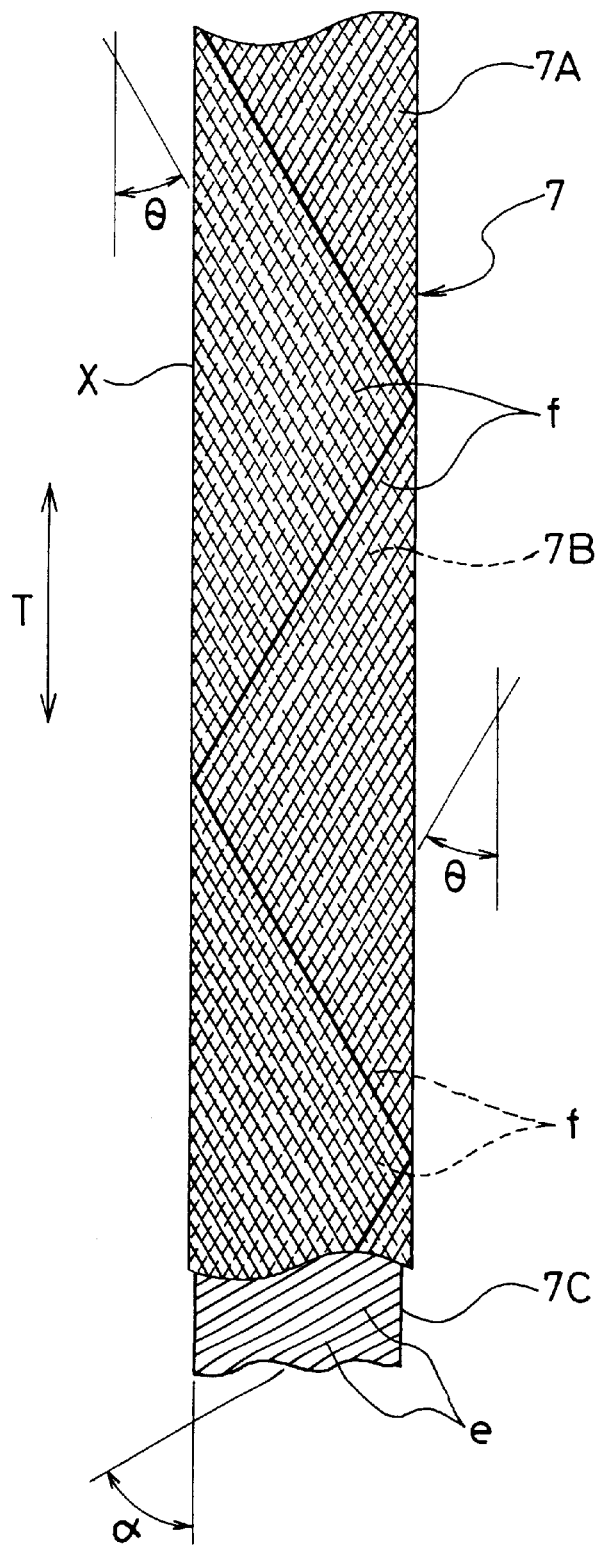
FIG. 5 is a partial cut-away plan view of principal portions of the belt layers shown in FIG. 4.
Figure 6:
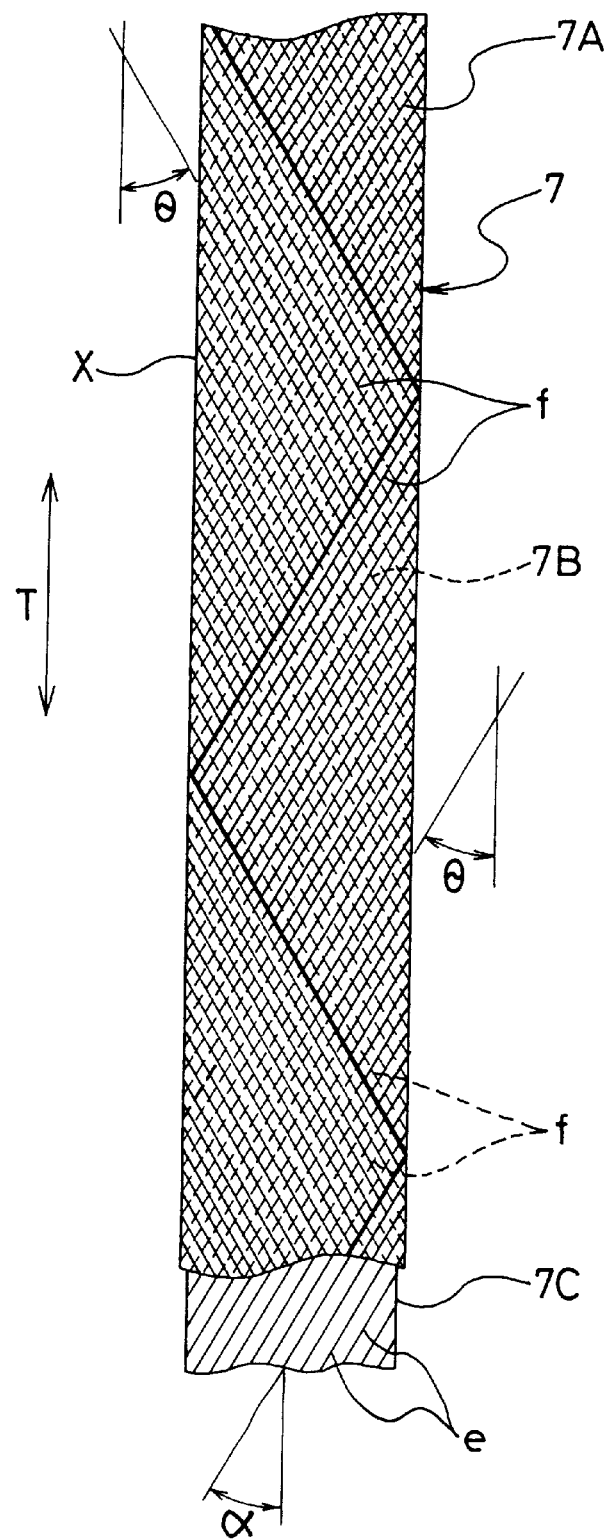
FIG. 6 shows still another example of a pneumatic radial tire according to the present invention, and is a partial cut-away plan view of belt layers corresponding to FIG. 5.

The three belt layers 7A, 7B and 7C disposed on the outer peripheral side of the carcass layer 4 of the tread portion 1 have the same structure as that of the belt layer shown in FIG. 5. In other words, each of the two outer belt layers 7A, 7B is formed by inclining the strip formed by aligning a plurality of steel cords relative to the tire circumferential direction, extending zigzag the strip in the tire circumferential direction in such a fashion as to be turned back from the inner belt layer 7B to the outer belt layer 7A at both end portions of each belt layer 7A, 7B and to define the zone portions in which the steel cords incline to the right and the zone portions in which the steel cords incline to the left in the tire circumferential direction. The innermost belt layer 7C is formed by arranging a large number of steel cords obliquely to the tire circumferential direction so that both of its end portions are covered with the belt layers 7A and 7B. This structure can improve straight driving stability while improving the edge separation resistance of the belt layers even in the pneumatic radial tire for a heavy load car.

Figure 8:
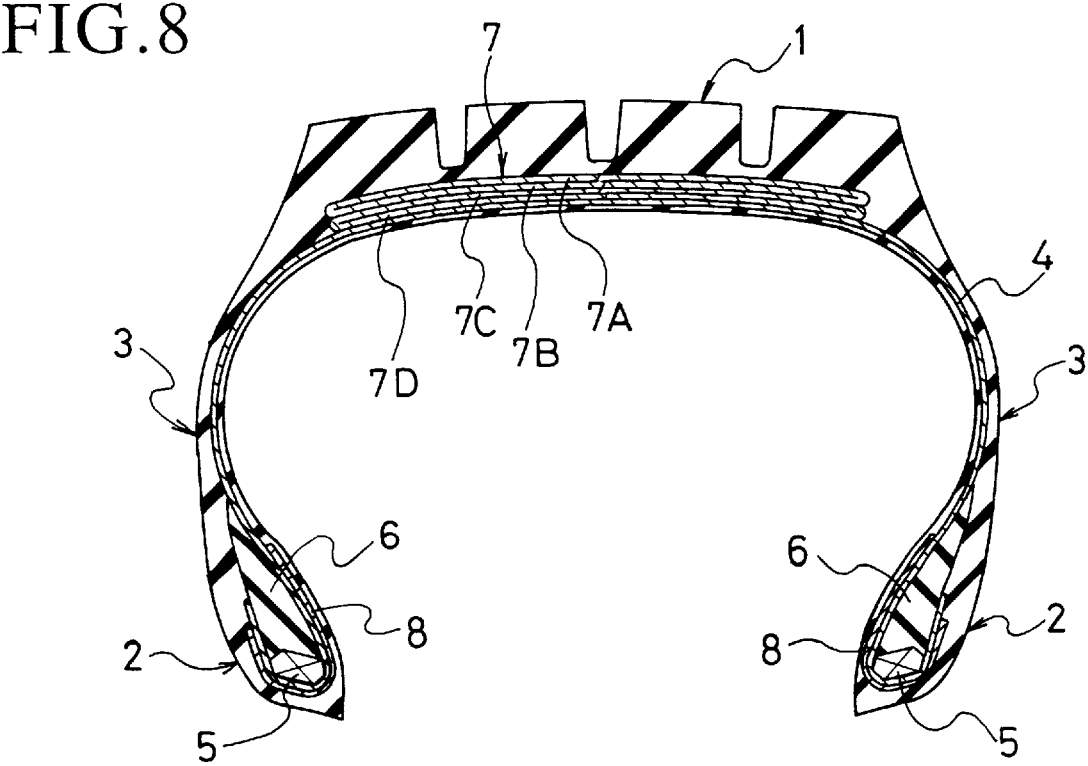
FIG. 8 is a tire meridian sectional view showing another example of a pneumatic radial tire used for a heavy load car according to the present invention.

FIG. 8 shows another example of the pneumatic radial tire used for a heavy load car according to the present invention. The embodiment given above represents the case where three belt layers are disposed and in this embodiment, four belt layers formed by arranging the steel cords are disposed.

Two outer belt layers 7A and 7B and two inner belt layers 7C and 7D have the same structure as the belt layers 7A and 7B described above (see FIG. 2). The similar effect can be obtained by employing the structure described above for each two adjacent layers when even-numbered belt layers are disposed.

In the belt layers shown in FIG. 7, the angle of inclination of the steel cords of the belt layers is preferably 15 to 45 degrees for the steel cords of the belt layers 7A and 7B and 15 to 65 degrees for the steel cords of the belt layer 7C.

In the belt layers shown in FIG. 8, the angle of inclination of the steel cords is preferably 15 to 45 degrees for both of the outer belt layers 7A, 7B and the inner belt layers 7C, 7D.

In the pneumatic radial tires for the heavy load cars such as a bus, a truck, etc, the present invention can be used appropriately by disposing at least three belt layers as in the embodiment described above.

On the other hand, in the pneumatic radial tire for a heavy load car such as a small truck, at least two belt layers 7A and 7B are disposed and the similar effect can be obtained by constituting these belt layers in the same way as described above.

Incidentally, the terms "pneumatic radial tire for passenger cars" and "pneumatic radial tire for small trucks and for buses and trucks (heavy load pneumatic radial tire)" represents those tires which are stipulated by JATMA YEAR BOOK (1996).

EXAMPLE 1

The present tires Nos. 1, 2 and 3 having the structure shown in FIG. 1, the present tire No. 4 having the structure shown in FIG. 4 and the conventional tire having the structure shown in FIG. 1 wherein only the belt layers were replaced by two belt layers in which the steel cords were arranged in such a fashion that the steel cords crossed one another between the layers and the cut ends of these steel cords existed at both ends, were produced, in a common tire size of 195/70R14.

In each of these test tires, the angle of inclination of the reinforcing cords of the belt layers was 30 degrees. The present tire No. 1 used polyethylene terephthalate fiber cords for the reinforcing cords of the belt layers, the present tire No. 2 used aromatic polyamide fiber cords for the reinforcing cords of the belt layers and the present tire No. 3 used steel cords for the reinforcing cords of the belt layers. The present tire No. 4 used the steel cords for the reinforcing cords of the innermost belt layer and the aromatic polyamide fiber cords for the reinforcing cords of the two belt layers outside the innermost belt layer.

Each of these test tires were fitted to a rim having a rim size of 14×6JJ, and belt durability and straight driving stability were evaluated under the following measurement conditions at a pneumatic pressure of 200 kPa. The result was tabulated in Table 1.

Belt durability

Each test tire was fitted to a drum test machine and an indoor drum test was carried out at a load of 7 kN and a speed of 81 km/hr so as to measure a driving distance before separation occurred at the end portions of the belt layers. The result was evaluated by an index value by using the value of the conventional tire as 100. The greater this value, the higher became belt durability.

Straight driving performance

Each test tire was fitted to a car having a piston displacement of 2,500 cc and a feeling test during straight driving was carried out in a test course by test drivers. The result was evaluated by an index value by using the value of the conventional tire as 100. The greater this value, the more excellent became straight driving stability.

TABLE 1

|  | present tire No. 1 | present tire No. 2 | present tire No. 3 | present tire No. 4 | conventional tire |
|---|---|---|---|---|---|
| belt durability | 107 | 109 | 110 | 105 | 100 |
| straight driving stability | 110 | 110 | 110 | 110 | 100 |

As can be seen clearly from Table 1, the present tires can improve straight driving stability while improving belt durability.

EXAMPLE 2

The present tire No. 5 having the structure shown in FIG. 1 and the present tire No. 6 having the structure shown in FIG. 4 were produced in the same tire size as that of Example 1. The present tire No. 5 had the same structure as the present tire No. 2 and the present tire No. 6 had the same structure as the present tire No. 4.

Each of these test tires was fitted to the same rim as that of Example 1 and maneuverability was evaluated under the following measurement conditions but at the same pneumatic pressure as in Example 1. The result was tabulated in Table 2.

Maneuverability

Each test tire was fitted to a drum test machine and a cornering force was measured at a load of 4.5 kN, a speed of 10 km and a slip angle of ±1°. The result was evaluated by an index value by using the value of the present tire No. 5 as 100. The greater this value, the higher the cornering force and more excellent became maneuverability.

TABLE 2

|  | present tire No. 5 | present tire No. 6 |
| --- | --- | --- |
| maneuverability | 100 | 105 |

It can be understood from Table 2 that the cornering force could be increased by disposing one belt layer having reinforcing cords of steel cords as the innermost belt layer and maneuverability could be improved.

As described above, the present invention employs he structure in which the reinforcing cords of the belt layers incline to the tire circumferential direction and are turned back zigzag at both end portions of the belt layers. Because the cut ends of the reinforcing cords do not exist at both ends of the belt layers, the edge separation resistance of the belt layers can be improved. Because the belt layers have the structure wherein the zone portions in which the reinforcing cords incline to the right and the zone portions in which the reinforcing cords incline to the left in the tire circumferential direction are alternately disposed, the ply steer can be improved and straight driving stability can be increased.

Industrial Applicability

The present invention having the excellent effects described above can be utilized extremely effectively for the pneumatic radial tires for the passenger cars, the pneumatic radial tires for the heavy load cars such as trucks and buses, and so forth.

We claim:

1. A pneumatic radial tire having at least three belt layers disposed at a tread portion, characterized in that two of said at least three belt layers are constituted by inclining a strip formed by aligning a plurality of reinforcing cords relative to a tire circumferential direction and extending said strip zigzag in the tire circumferential direction in such a fashion that said strip is turned back from the inner belt layer to the outer belt layer at both end portions of said belt layers, zone portion in which said reinforcing cords incline to the left in the tire circumferential direction and zone portions in which said reinforcing cords incline to the left in the tire circumferential direction are alternatively disposed in the tire circumferential direction, and one belt layer having a large number of steel cords arranged at an angle $\alpha$ of inclination of 5 to 65 degrees relative to the tire circumferential direction is disposed inside said two belt layers so that both end portions of said one belt layer are covered by said two belt layers.

2. A pneumatic radial tire according to claim 1, wherein said angle a of inclination satisfies $45° \leq \alpha \leq 65°$.

3. A pneumatic radial tire according to claim 2, wherein said angle a of inclination is $54.7° \pm 5°$.

4. A pneumatic radial tire according to claim 1, wherein said angle $\alpha$ of inclination satisfies $15° \leq \alpha < 45°$.

5. A pneumatic radial tire according to claim 4, wherein said angle $\alpha$ of inclination is 15° to 40°.

6. A pneumatic radial tire according to claim 1, wherein said reinforcing cords of said two belt layers are organic fiber cords.

7. A pneumatic radial tire according to claim 1, wherein said reinforcing cords of said two belt layers are steel cords.

8. A pneumatic radial tire according to claim 1, wherein the angle $\theta$ of inclination of said reinforcing cords relative to the tire circumferential direction is 15° to 45°.

* * * * *